(12) United States Patent
Berfield

(10) Patent No.: US 7,395,601 B2
(45) Date of Patent: Jul. 8, 2008

(54) ROTARY FLAIL FEEDING DEVICE

(76) Inventor: Robert C. Berfield, 3681 Nichols Run Rd., Jersey Shore, PA (US) 17740

( * ) Notice: Subject to any disclaimer, the term of this patent is extended or adjusted under 35 U.S.C. 154(b) by 29 days.

(21) Appl. No.: 11/677,609

(22) Filed: Feb. 22, 2007

(65) Prior Publication Data

US 2008/0098606 A1  May 1, 2008

Related U.S. Application Data

(60) Provisional application No. 60/863,621, filed on Oct. 31, 2006.

(51) Int. Cl.
*B26B 27/00* (2006.01)
*A01D 34/67* (2006.01)
(52) U.S. Cl. ............... 30/276; 30/347; 56/12.7
(58) Field of Classification Search .......... 30/276, 30/347, 272.1, 263; 56/12.7, 295
See application file for complete search history.

(56) References Cited

U.S. PATENT DOCUMENTS

| 4,124,938 A | 11/1978 | Ballas, Sr. |
| 4,136,446 A | 1/1979 | Tripp |
| 4,148,141 A | 4/1979 | Hoff |
| 4,156,967 A | 6/1979 | Ballas, Sr. |
| 4,223,440 A | 9/1980 | Inaga |
| 4,557,052 A | 12/1985 | Baba et al. |
| 4,685,279 A | 8/1987 | Gullett |
| 4,707,919 A | 11/1987 | Tsuchiya |
| 4,819,333 A | 4/1989 | Baba |
| 4,916,886 A | 4/1990 | Nakamura et al. |
| 5,675,897 A | 10/1997 | Berfield |
| 5,743,019 A | 4/1998 | Berfield |
| 5,836,227 A | 11/1998 | Dees, Jr. et al. |
| 6,385,853 B1 | 5/2002 | Berfield |
| 6,457,242 B1* | 10/2002 | Fogle .......................... 30/347 |
| 6,481,107 B2 | 11/2002 | Berfield |
| 2002/0129498 A1* | 9/2002 | Berfield ....................... 30/276 |

OTHER PUBLICATIONS

Poulan Instruction Manual, Nov. 13, 2001.

\* cited by examiner

*Primary Examiner*—Ghassem Alie
(74) *Attorney, Agent, or Firm*—Hooker & Habib, P.C.

(57) ABSTRACT

A rotary flail feeding device for trimming vegetation includes a head for storing flail line and a unitary, removable subassembly comprising a winding post and a line guide ring rotatably mounted on the post. The subassembly is removed from the head to facilitate loading flail line into the cavity and to assure that dual flail lines are properly positioned when the subassembly is repositioned on the head.

16 Claims, 12 Drawing Sheets

ROTARY FLAIL FEEDING DEVICE

This application claims the benefit of Provisional Patent Application No. 60/863,621 filed Oct. 31, 2006.

FIELD OF THE INVENTION

The invention relates to rotary flail feeding devices used to trim vegetative matter.

DESCRIPTION OF THE PRIOR ART

U.S. Pat. Nos. 5,675,897, 5,743,019, 6,385,853 and 6,481,107 disclose rotary flail feeding devices for cutting grass, weeds, small shrubs and the like. In these devices, coiled flail line is stored in a cavity in a rotary head and is automatically fed radially inwardly, wound around a central post and extended outwardly through a circumferential flail slot to form one or more rotary flails. The devices are rotated by a conventional electric motor or gasoline engine so that the flails are held outwardly by centrifugal force for cutting. During operation, the ends of the flails are worn or break away and are automatically replaced by additional flail line unwound from the central post, without operator intervention. The heads may be purchased with coil line pre-wound in the heads or, alternatively, operators may pre-wind coil line in the heads.

The heads of prior fail feeding devices may be purchased filled with coiled flail line. During operation of dual flail devices, two lengths of flail line in the storage cavity extend through the passage, are wound around the post, extend through two slots in a line guide on the post, extend into the fail slot to form flails and, through use, are exhausted.

When flail line is wound into empty heads, lengths of line are fed through the feed passage into the head and are spiral wound into the storage cavity to form a single or dual outwardly extending flails.

To load dual flail line into a conventional flail feeding device, the operator must first disassemble the device and remove the winding post and the loose part line guide from a recess in the head. The removed line guide is a small part separate from the post, can be difficult to hold and is easily dropped or lost. Two recommended lengths of flail line are then manually inserted into the feed passage and wound into the cavity in the head. Feeding and winding continues until the ends of the flail lines extend outwardly of the passage and into the recess previously occupied by the winding post. The device is then reassembled by positioning the line guide over the recess with the two flail lines fitted in 180° opposed line guide slots. The post is then extended through the center of the line guide and into the recess in the head to complete reassembly.

Separating of the two flail lines and fitting of the flail lines in the line guide slots typically extends one of the flail lines across the recess in the path of movement of the post into the recess. The post must displace the flail line across the recess thereby introducing the possibility of moving the flail line over or crossing the other flail line. This causes a misfeed in the flail lines or a jam in the head which will prevent automatic feeding of the lines during operation of the flail feeding device. In order to clear the jam, it is necessary to disassemble the device, correctly position the flail lines, correctly extend the post in the recess and finalize the assembly of the post and ring to the head.

Thus, there is a need for an improved rotary flail feeding device where the line guide is permanently mounted on the post so that the device can be disassembled for feeding line into the storage cavity without removing the guide from the post and risking loss of the guide. There is also the need for an improved rotary flail feeding device which can be reassembled after loading of dual flail line with the lines properly positioned in the line guide slots without crossed lines or jams. There is the need for a rotary flail feeding device with a unitary subassembly including a line guide ring mounted on a winding post to reduce the risk of loss of the guide and facilitate easy disassembly before loading and reassembly after loading without the need to position the line guide ring on the flail lines above the recess before extending the post into the recess. There is also the need for a rotary flail feeding device which reduces jams at the line guide due to cuttings and debris.

SUMMARY OF THE INVENTION

The disclosed flail feeding devices include a winding post and line guide subassembly removable from and insertable into the head as a unit. The line guide ring is rotatably mounted on the post to facilitate removal of the subassembly from the head as a unit and expose the feed passage for ready feeding of two flail lines into the storage cavity. The line guide is secured to the post so that it cannot be separated from the post during head disassembly and reassembly. The risk of losing the individual line guide is reduced and reassembly of the head after loading is facilitated.

After two lengths of flail line have been wound into the trimmer head the ends of the flail line extend out of the feed passage and of the central recess in the head. The post on the unitary subassembly is then extended into the recess, past the two flail lines and past the feed passage in order to capture the flail lines in proper orientation between the head and the post. With further insertion of the subassembly, the line guide is brought adjacent to two flail lines. The operator rotates the line guide or the flail lines around the post to position the lines in the line guide slots in the guide. With the post in the central recess and the line guide held on the post nearly full insertion of the post into the recess is permitted before the line guide engages the flail lines. The partially inserted post assures the proper orientation of the flail lines before the flail lines are fitted into the line guide slots. Crossed lines are avoided.

Top feed devices include a rotating or stationary shield overlying the line guide ring. The shields include a wall surrounding the line guide ring to reduce the possibility of cuttings and debris causing a jam.

Other objects and features of the invention will become apparent as the description proceeds, especially when taken in conjunction with the accompanying drawings illustrating the invention.

DETAILED DESCRIPTION OF THE PREFERRED EMBODIMENTS

U.S. Pat. Nos. 5,675,897, 5,743,019, 6,385,853 and 6,481,107 disclose rotary flail feeding devices related to the present invention. The disclosures of U.S. Pat. Nos. 5,675,897, 5,743,019, 6,385,853 and 6,481,107 are incorporated herein by reference in their entireties.

Figure 1:
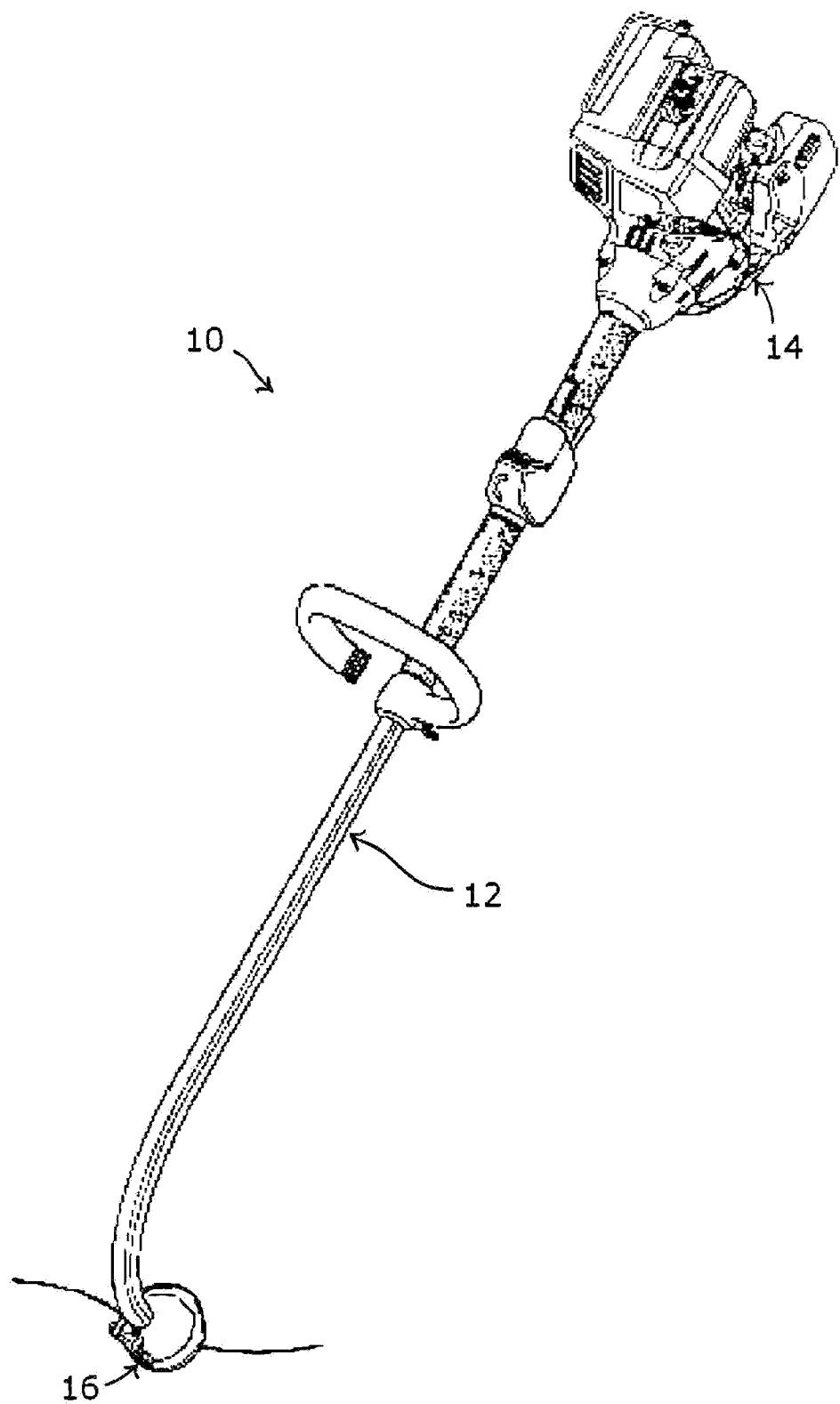
FIG. 1 is a perspective view of a two-flail rotary string trimmer in which the present invention may be used.

FIG. 1 illustrates flail type vegetative trimmer 10 having an elongate boom 12 with a gas engine 14 mounted on the upper end of the boom and a rotary flail feeding device 16 mounted on the lower end of the boom. Alternatively, an electric motor may be mounted on the upper end of the boom.

Engine or motor 14 rotates a flexible drive shaft 18 that extends along the length of the boom. The lower end of drive shaft 18 is connected to threaded mounting bolt or stud 20 which extends below the lower end of the boom. Hexagonal mounting nut 22 is rotatably mounted on drive shaft 18.

Rotary flail feeding device 16 includes a rotary head 24 having a circular hollow top member 26 and circular hollow bottom member 28 with walls defining an annular line storage cavity 30 therebetween. A plurality of latch connections 32 secure members 26 and 28 together to form unitary head 24. Hexagonal mounting nut 22 extends into hexagonal recess 34 on the top of member 26 for rotation of the head by the drive shaft.

The head surrounds unitary post/line guide subassembly 36 mounted on stud 20 and removably fitted in central recess 76 opening into the bottom of head 24. Handle 38 is rotatably mounted on the lower end of bolt 20 to hold subassembly 36 in the head and secure the head and subassembly on drive shaft 18.

Figure 2:
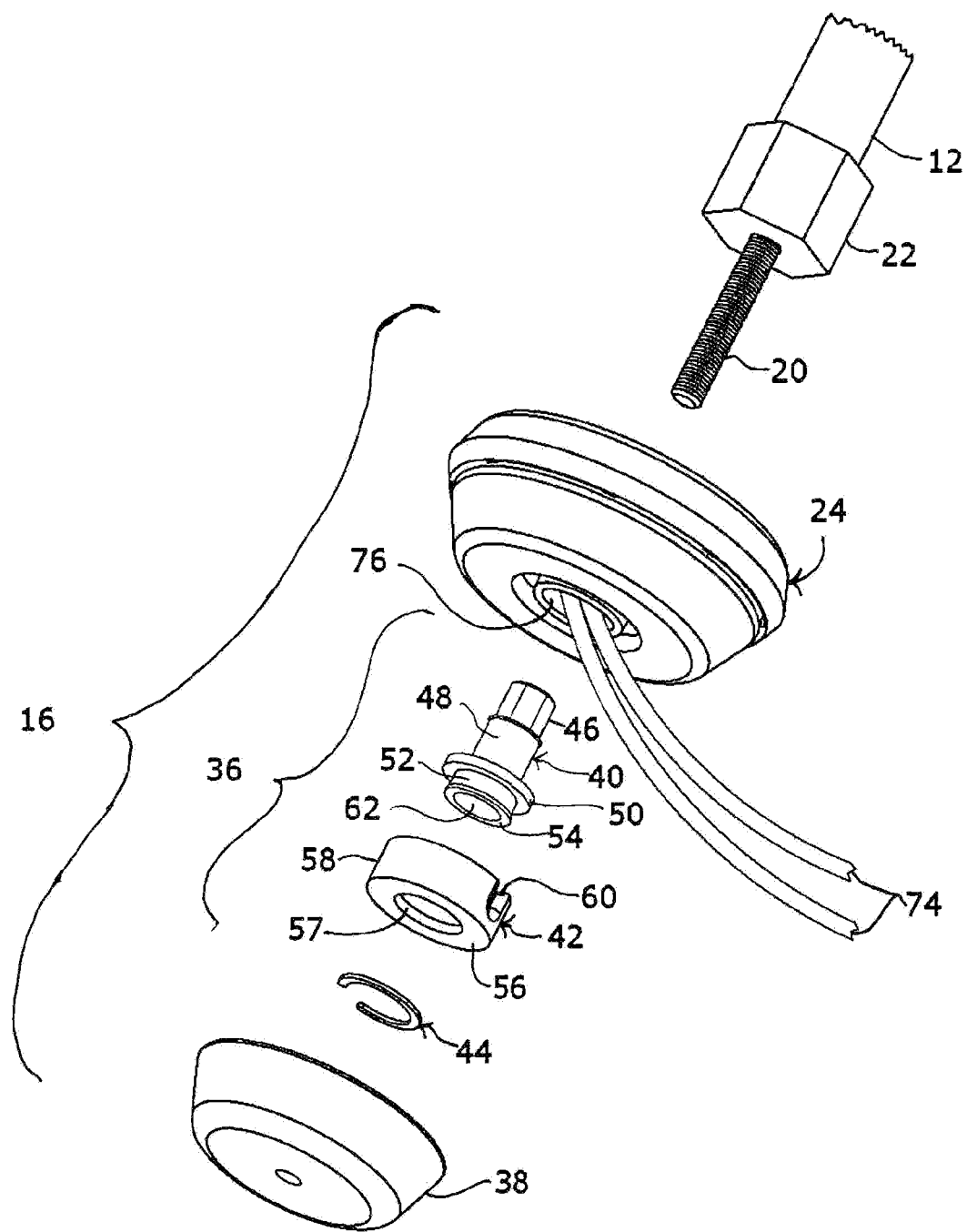
FIG. 2 is an exploded perspective view of a first embodiment rotary flail feeding device.
Figure 5:
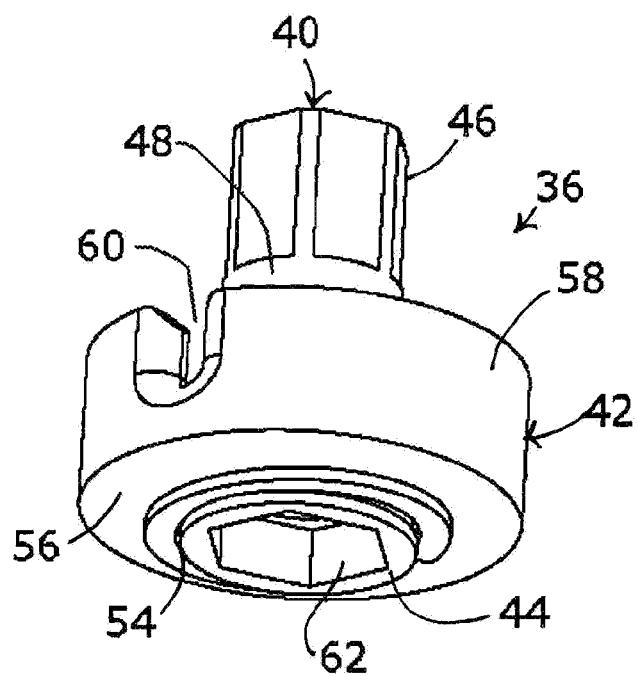
FIG. 5 is a perspective view of a subassembly used in the device of FIG. 2.

Subassembly 36, shown disassembled in FIG. 2 and assembled in FIG. 5, includes a generally cylindrical post 40, line dividing or guide ring 42 and C-clip 44. The post 40 has a hexagonal upper drive end 46, a cylindrical line winding surface 48 adjacent end 46, a ring retention collar 50 at the lower end of surface 48, a narrow cylindrical mounting portion 52 below collar 50 and retention flange 54 at the bottom of portion 52. Central passage 62 extends between the upper and the lower ends of post 40.

Line dividing or guide ring 42 includes flat ring 56 having a central hole 57 and a cylindrical wall 58 extending upwardly from the outer edge of the ring. Two diameterally opposed line guide slots 60 extend through wall 58 and open away from ring 56. The inner, outer and top edges of slots 60 are rounded to facilitate feeding flail line through the slots and reduce wear. With clip 44 removed from the post, ring 42 is positioned on ring retention portion 52 of post 40. Portion 52 extends through hole 57. After the ring is positioned on the post, C-clip 44 is snapped onto the retention portion above retention flange 54 so that ring 42 is permanently mounted on the post between collar 50 and clip 44 and is freely rotatable around the post.

Figure 3:
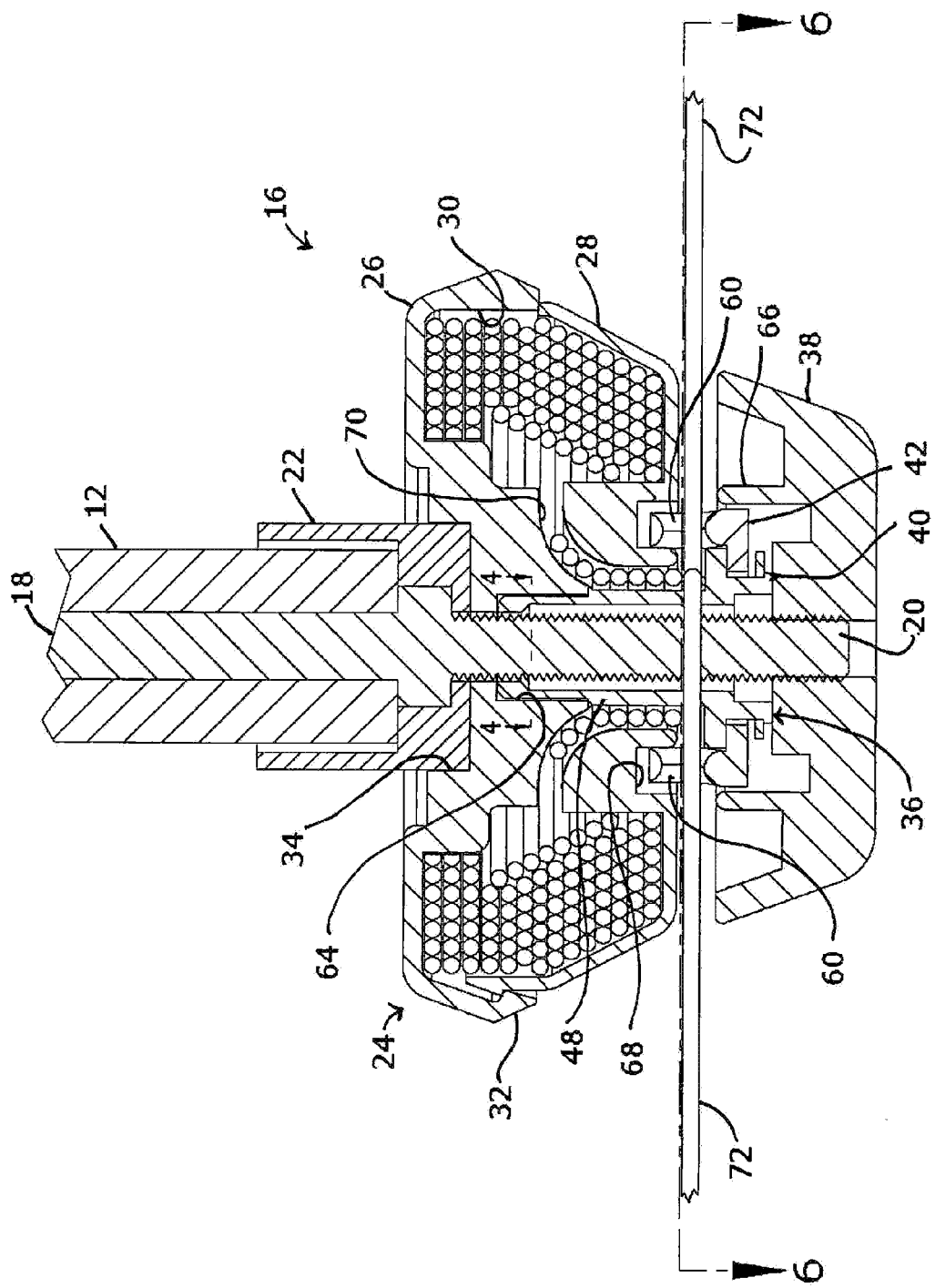
FIG. 3 is a vertical sectional view taken through the device of FIG. 2.
Figure 4:
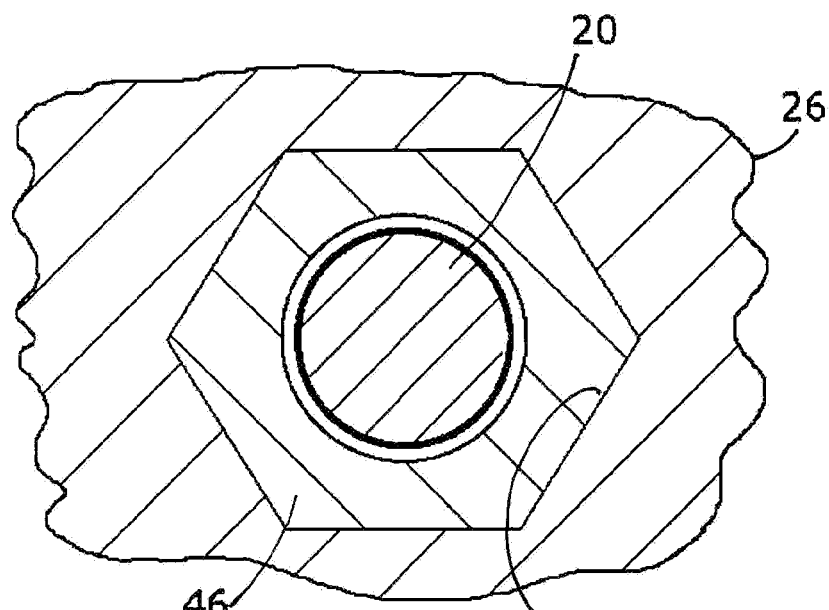
FIG. 4 is a view taken along line 4-4 of FIG. 3.

Head 24 is mounted on the lower end of boom 12 as shown in FIG. 3. Nut 22 is seated in recess 34 so that the head is rotated by shaft 28. Stud 20 extends through central openings in the top and bottom members 26 and 28 and projects below the bottom of member 28. Subassembly 36 is positioned in the central recess 76 in members 26 and 28 with hexagonal drive end 46 seated in hexagonal opening 64 in top member 26. Stud 20 extends through passage 62 and below head 24.

Handle 38 is threaded onto the lower end of stud 20 and engages the lower end of subassembly 36 to hold the subassembly tightly in place. The handle 38 includes a circumferential wall 66 extending upwardly and surrounding the lower portion of line dividing ring 42 below line guide slots 60. The upper end of wall 66 is rounded to reduce abrasion with flail line fed outwardly from the post during trimming.

The upper portion of ring 42 is fitted in circular recess or groove 68 formed in the bottom of member 28 to confine flail lines 72 fed through the line guide slots during trimming. Ring 42 is freely rotatable around the post and head. Members 26 and 28 define a line feed passage 70 extending radially inwardly from cavity 30 and then downwardly along line winding surface 48 on post 40.

During operation of device 16 coils of dual flail line in cavity 30 are fed in through line feed passage 70, wound around winding surface 48, are fed through the two 180 degree opposed line slots in line dividing ring 42 and extend radially outwardly from device 16 to form a pair of opposed cutting flails 72. During operation of the trimmer, the ends of the flails 72 are worn away and are automatically replenished from flail line wound around surface 48. Additional flail line is fed from the coils in chamber 30 through passage 70 and to the coils of line wound around surface 48. With continued operation, the flail line stored in cavity 30 is exhausted and it is necessary to wind additional dual flail line into head 24.

In order to reload the head 24 with flail line engine 14 is stopped and handle 38 is removed from stud 20. Head 24 and subassembly 36 are then manually disengaged from the nut 22. The subassembly 36 is manually withdrawn from recess 76. Removal of the subassembly opens recess 76 for visual inspection and easy feeding of dual flail line into the exposed and open end of passage 70 leading to cavity 30. The operator extends the ends of two lengths of flail line 74, shown in FIG. 2, into recess 76 in bottom member 28 and into the exposed end of passage 70. The two flail lines 74 are fed, side-by-side, through passage 70, into storage cavity 30 and, with continued feeding, are wound into the cavity. During feeding, the two flail lines are rotated around recess 76 and passage 70 as the flail lines are wound into the cavity. The diameter of the flail lines 74 is greater than one-half the width of passage 70 so that during winding of line into cavity 30 it is not possible to cross one of the flail lines 74 over the other flail line or cause a flail line jam in the passage. The flail lines are wound side by side into cavity 30 in a direction opposite to the direction of rotation 78 of device 16 during trimming in order to assure proper automatic feeding of flail line from the cavity to flails 72 during trimming.

After sufficient flail line has been wound into head 24 to fill cavity 30, the operator extends the lead end of subassembly post 40 into recess 76 and past the two flail lines 74 extending out of passage 70. The post holds the flail lines in proper orientation in the recess in the same relative position they occupied during feeding of flail line into cavity 30.

Partial insertion of the subassembly post into the recess moves alignment ring 42 adjacent the flail lines and permits rotation of the ring or the flail lines around the post to fit the flail lines in slots 60. Proper orientation of the lines is maintained as the lines are placed in the slots. The lines are not crossed over each other. With the flail lines positioned in slots 60 as described the subassembly is fully inserted or seated in recess 76 and the head and subassembly are mounted on stud 20 to form a drive connection with nut 22. Handle 38 is then rotated onto the protruding end of the stud to secure flail feeding device 16 in place on the boom as shown in FIG. 3.

Line guide ring 42 is rotatably mounted on post 40 away from end 46 permitting free piloting movement of post end 46 and winding surface 48 into recess 76 to hold the flail lines 74 in proper orientation in the recess 76. The ring is moved adjacent the lines. Orienting the lines 76 in proper relative position in the space between the post and the outer surface of recess 76 before the line guide member 42 is brought into engagement with the lines assures that the lines are easily rotated around the post for proper insertion into the line guide slots 60 without crossing the lines or forming jams.

Figure 6:
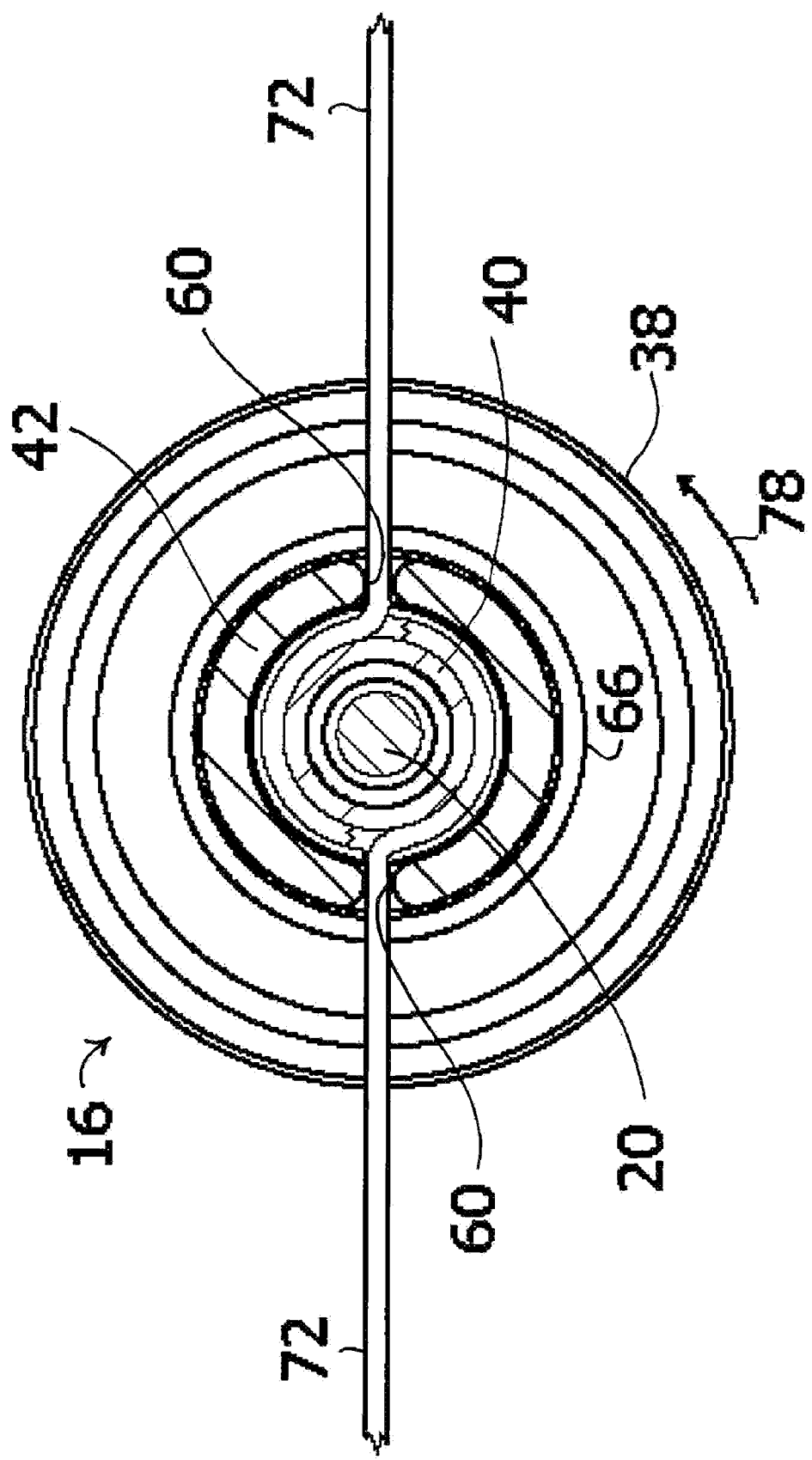
FIG. 6 is a view taken along line 6-6 of FIG. 3.

As shown in FIG. 6, device 16 rotates in the direction of arrow 78 during trimming. Feeding of flail line wound on surface 48 outwardly through slots 60 to lengthen worn lines 74 unwinds the line in an upstream direction around post 40 or in the direction of arrow 78. Unwinding of flail line from the winding surface also rotates dividing ring 42 in the direction of arrow 78 relative in rotating device 16.

Figure 7:
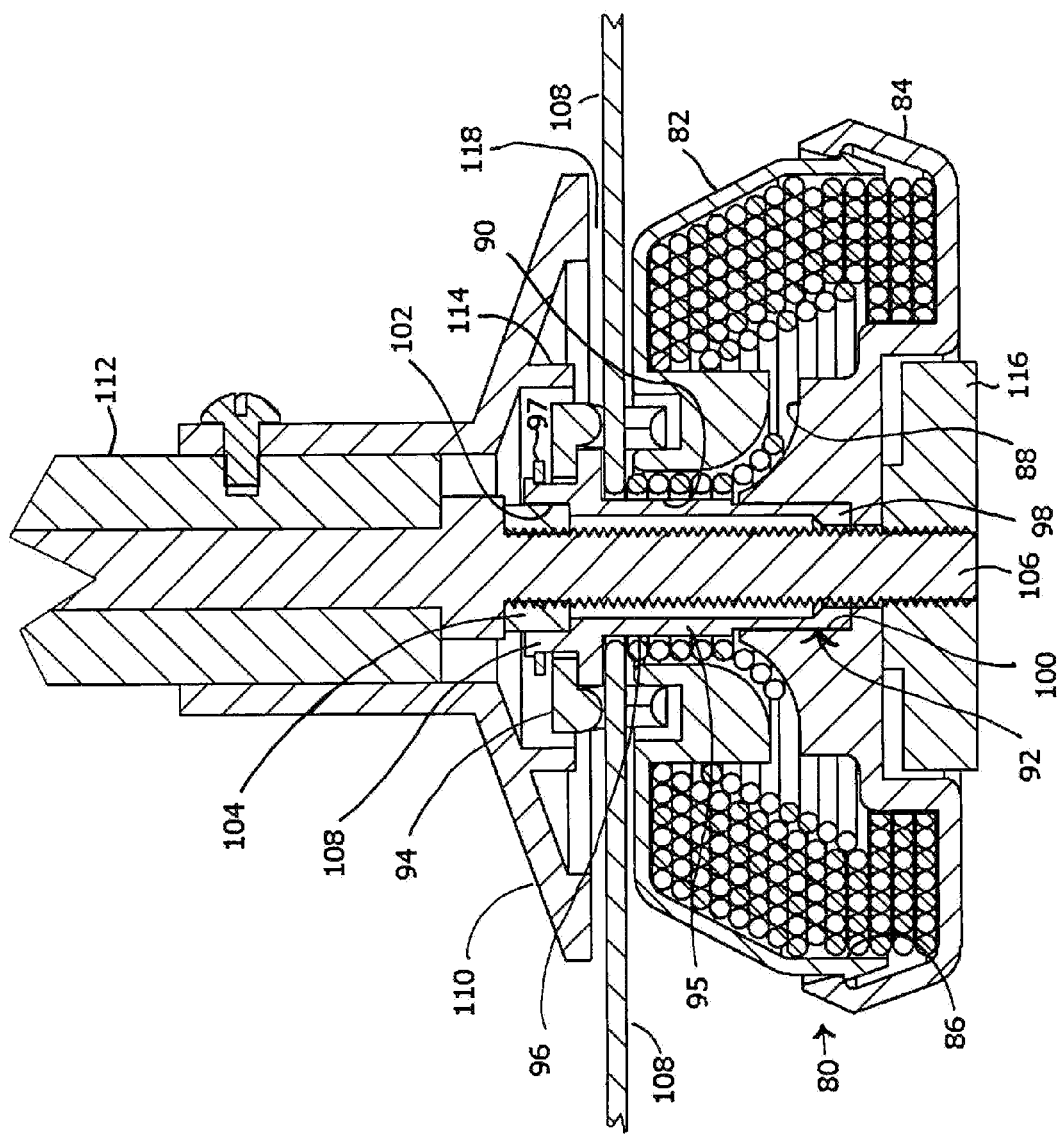
FIG. 7 is a vertical sectional view taken through the device of a second embodiment rotary flail feeding device.
Figure 8:
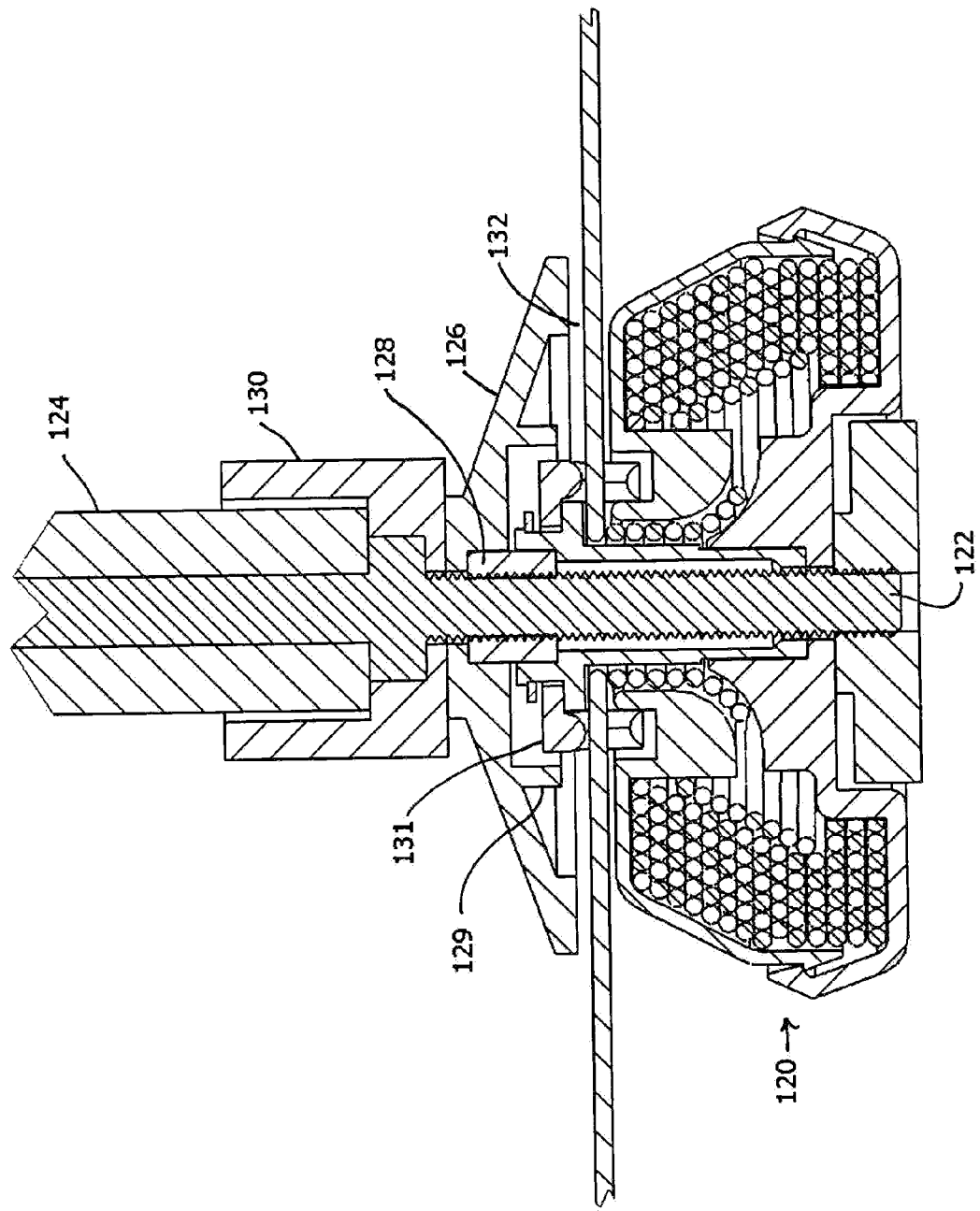
FIG. 8 is a vertical sectional view taken through the device of a third embodiment rotary flail feeding device.

In the first preferred embodiment of FIGS. 1 to 6, dual flail line is fed out from the bottom of head 24. FIGS. 7 and 8 are sectional views illustrating second and third preferred embodiments of the invention in which dual flail line is fed out from the top of the rotary head, between the head and the bottom of the boom. Each of these embodiments includes a removable post/line guide subassembly like assembly 36 to facilitate positioning of dual flail lines in line guide slots.

In FIG. 7, top feed rotary head 80 includes circular hollow top and bottom members 82 and 84, similar to bottom and top members 28 and 26 in first embodiment head 24. Members 82 and 84 are latched together and surround an annular line storage cavity 86. Line feed passage 88 extends from the inner wall of cavity 86 radially inwardly and curves upwardly toward open body end 90 at the top of head 80. A post/line guide subassembly 92, like subassembly 36, is fitted in opening 90 and includes a line dividing ring 94, like ring 42, a post 108, like post 40 and having a cylindrical line winding surface 96, like surface 48, and a hexagonal lower drive end 98, like end 46. C-clip 97 holds ring 94 on member 95. End 98 is fitted in hexagonal drive recess 100, like recess 34. A hexagonal drive recess 102 formed on the upper end of subassembly 92 engages hex nut 104 mounted on the upper end of mounting stud 106. Ring 94 is mounted on post 108 of subassembly 92 and is freely rotatable around the post.

Fixed line guide shield 110 is mounted on the lower end of the outer, non-rotatable casing 112 of trimmer boom and extends radially outwardly and around the boom to overly head 80 and line guide ring 94. Shield 110 includes a downwardly extending circumferential wall 114 located outwardly from line guide ring 94.

Head 80 is mounted on the lower end of the boom by rotary handle 116. Stud 106 extends from the drive shaft in the boom through a central passage in subassembly 92 and projects outwardly below the bottom of member 84. Handle 116 clamps head 80 and post/line guide subassembly 92 against nut 104 for rotation by the drive shaft.

During operation of the trimmer shown in FIG. 7, abraded shortened flails 108 are replenished by flail line wound in cavity 86 and fed from the cavity through passage 88, around winding surface 96, outwardly through the line guide slots in ring 94 and outwardly from the device through flail slot 118 as shown in FIG. 7. The shield reduces the possibility of cuttings and debris being drawn into the circumferential line slot 118 between the shield and the top of head 80. Cuttings and foreign material drawn into the slot reduce cutting efficiency and causes jams that require turning off of the trimmer and clearing of the jam.

Upon exhaustion of wound flail line in cavity 86 the trimmer is turned off to re-feed dual flail line into cavity 86. This is accomplished by manually disengaging handle 116 and removing the head 80 and subassembly 92 from stud 106. Subassembly 92 is then manually removed from the head. Ring 94 and post 108 are retained together as a unit when removed, lessening the chance of misplacing or losing either of these components. Dual flail line can be wound into cavity 86 through opening 90 as previously described. After the cavity has been filled with wound flail line, subassembly 92 is repositioned into opening 90 to correctly position the two lines. The two protruding flail lines are then rotated around the post and positioned in the line guide slots in ring 94 as previously described. The head and line guide subassembly are then remounted onto stud 106 by handle 116 as previously described. Trimming is then recommenced.

The top feed trimmer shown in FIG. 7 has the advantage of feeding flails 108 outwardly from the top of head 80, a distance above ground level. Locating the flails above the head reduces the chance that debris and cuttings will be drawn into slot 118 and cause a jam.

FIG. 8 illustrates a second top feed head 120 identical to top feed head 80. Head 120 is mounted on threaded stud 122 extending downwardly from the lower end of boom 124.

A rotary shield 126, similar in size to shield 110, is mounted to the drive shaft between hex nut 128, like nut 104, and mounting nut 130, like nut 22.

The rotary flail feeding device of FIG. 8 operates like the device of FIG. 7. Wall 129 surrounds ring 131. Dual flail line is fed into the cavity of head 120 as described. During operation, shield 126 rotates with head 120 to reduce the chance of drawing cuttings and debris into flail slot 132.

Figure 9:
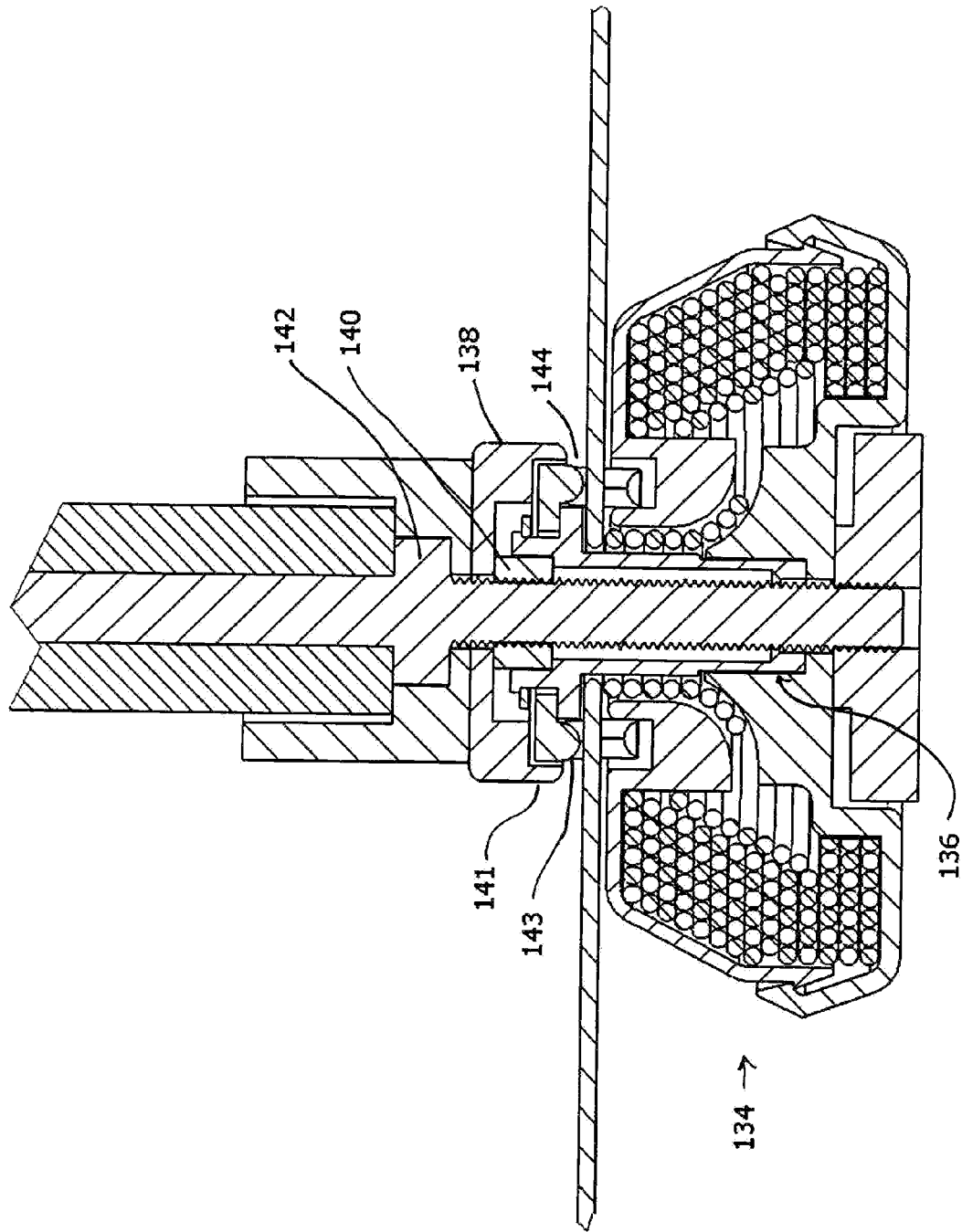
FIG. 9 is a vertical sectional view taken through the device of a fourth embodiment rotary flail feeding device.

FIG. 9 illustrates a further preferred embodiment of the invention similar to the embodiment of FIGS. 7 and 8. Top feed head 134 is identical to head 80 or head 120 and post/line guide subassembly 136 is identical to subassembly 92. A narrow shield 138 rotates with head 134 and is clamped in place between nut 140 and top feed head 134. Shield wall 141 surrounds ring 143.

Shield 138 extends outwardly over line guide ring 144 to protect the ring from cuttings and debris during trimming. Also, head 134 has a greater diameter than the shield and ring located on the top of the head so that the head also prevents debris and cuttings from entering into the radially short flail slot 144 and causing jams.

Figure 10:
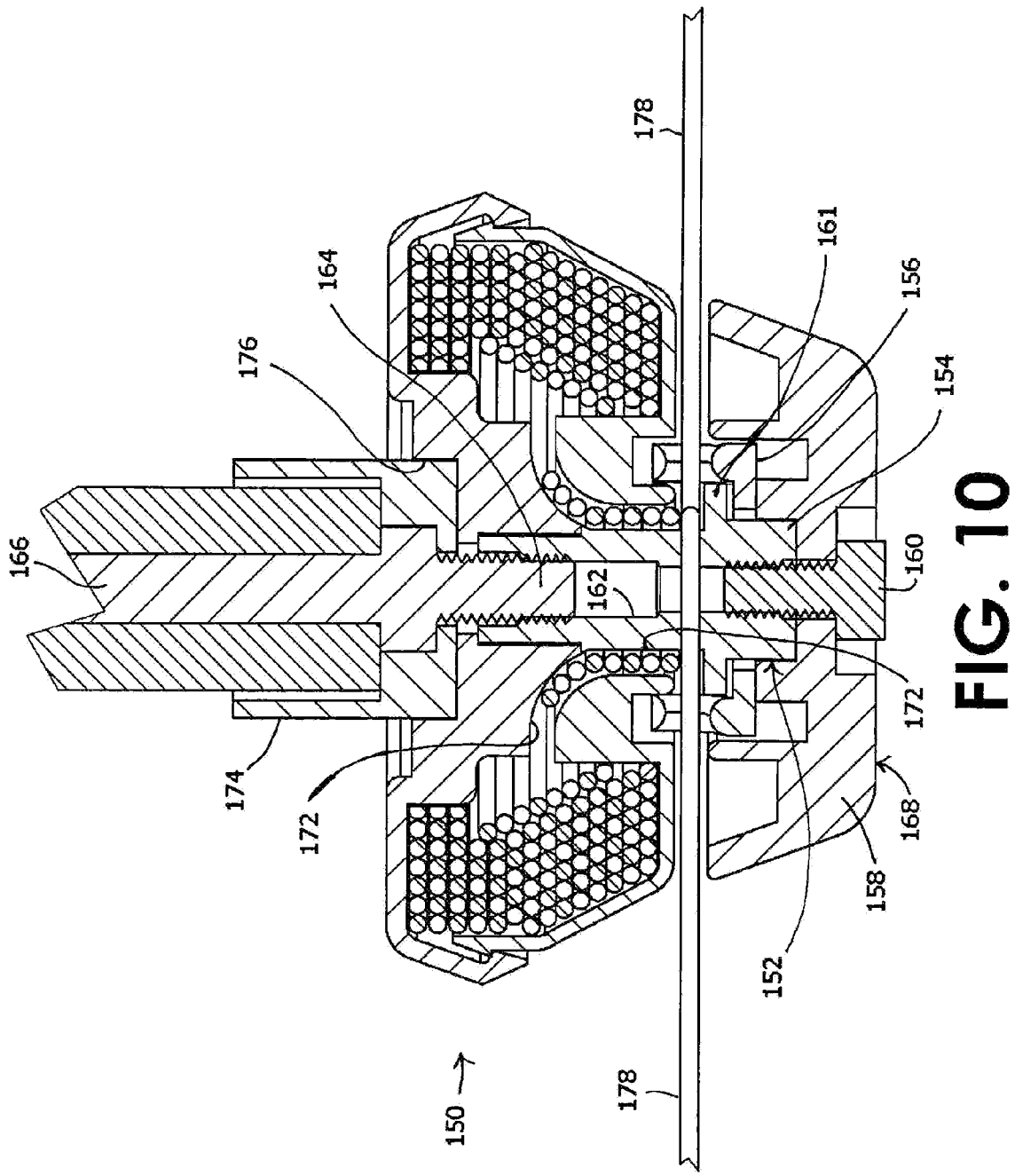
FIG. 10 is a vertical sectional view taken through the device of a fifth embodiment rotary flail feeding device.

FIG. 10 illustrates a bottom feed head 150, like head 24, with a post/line guide assembly 152 similar to assembly 36 including a post 154 and line guide ring 156. Rotary handle 158 is permanently mounted on the bottom of member 154 by bolt 160. Ring 156 is rotatably held on post 154 between member retention collar 161 and handle 158. The upper end of the central passage 162 extending through the post is threaded for removable engagement with short stud 164 mounted on the lower end of boom drive shaft 166.

During operation, rotary flail feeding device of FIG. 10 operates identically to the device of FIG. 3. Two 180 degree-oriented flails 178 extend outwardly from the head for vegetative cutting. The flails are automatically replenished when shortened.

When flail line stored in the cavity in head 150 is exhausted, the head must be disassembled in order to feed additional flail line into the cavity. This is accomplished by stopping the machine and rotating handle 158 to disengage the threaded connection between post 154 and stud 164. Post 154, ring 156 and handle 158 form a subassembly 168 removable from head 150 as a unit. Removal of the subassembly 168 withdraws the ring 156 and post 154 from the head central recess 170 and permits inspection of line feed passage 172 by the operator to facilitate feeding dual flail line through the passage and into the cavity in proper orientation and reinsertion of the subassembly and fitting of the lines in the ring slots without jams, as previously described. Head 150 may be removed from the boom during winding of flail line into the cavity.

The subassembly 168 is larger than post/line guide subassembly 136 and is less liable to be lost or misplaced by the operator when the flail feeding device is disassembled.

Figure 11:
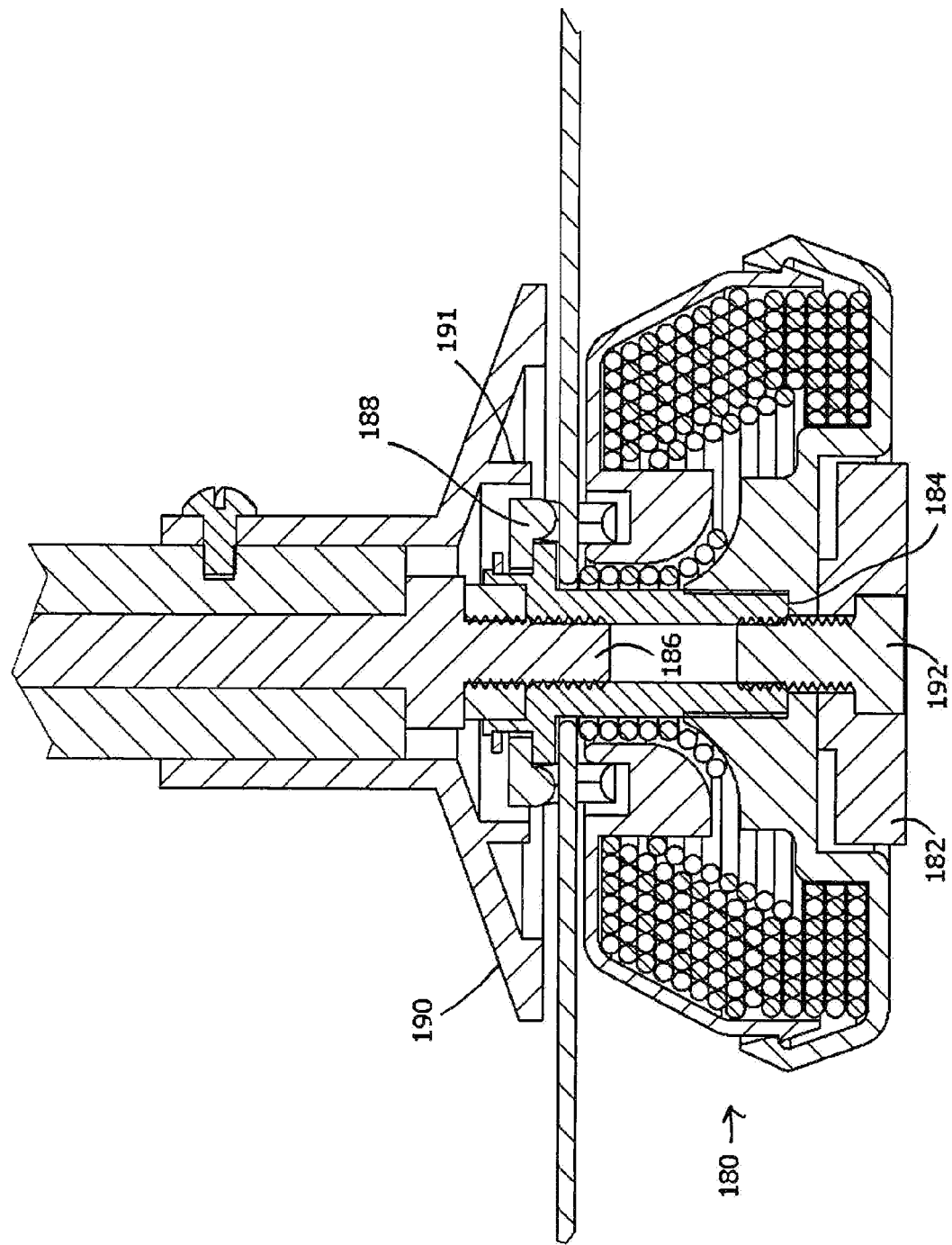
FIG. 11 is a vertical sectional view taken through the device of a sixth embodiment rotary flail feeding device.

FIG. 11 illustrates a top feed rotary flail feeding device similar to the device shown in FIG. 7. Head 180 is identical to head 80. Handle 182 threadably engages the threaded lower end of mounted post 184. The post and supported ring 188 are permanently mounted on the drive shaft. Post 184 is threaded onto short stud 186 connected to the drive shaft. Line dividing ring 188 is mounted on the upper end of post 184 as in FIG. 7 and is rotatable around post 184. Non-rotatable line guide shield 190 is mounted on the casing of the boom. Wall 191 surrounds ring 188.

The rotary flail feeding device of FIG. 11 operates similarly to the device of FIG. 7. When flail line has been exhausted from the head cavity, the trimmer is shut down and the operator rotates handle 182 to disengage handle bolt 192 from member 184. Bolt 192 is preferably permanently attached to the handle. Removal of the handle and bolt permit the operator to remove head 180 from post 84 so that dual flail line may be loaded into the head through the central recess and line feed passage, as described previously. After the cavity has been wound full of dual flail line, the head is repositioned on post 184, the two flail lines 194 are then fitted in the line guide slots in ring 188 and handle 182 and bolt 192 are reattached to member 184 as previously described to complete reassembly and to clamp the head 180 against the post. The lower end of member 184 has a hexagonal shape and fits in a hexagonal shaped opening in the center of the bottom head member to form a drive connection for rotating the head with member 184.

Figure 12:
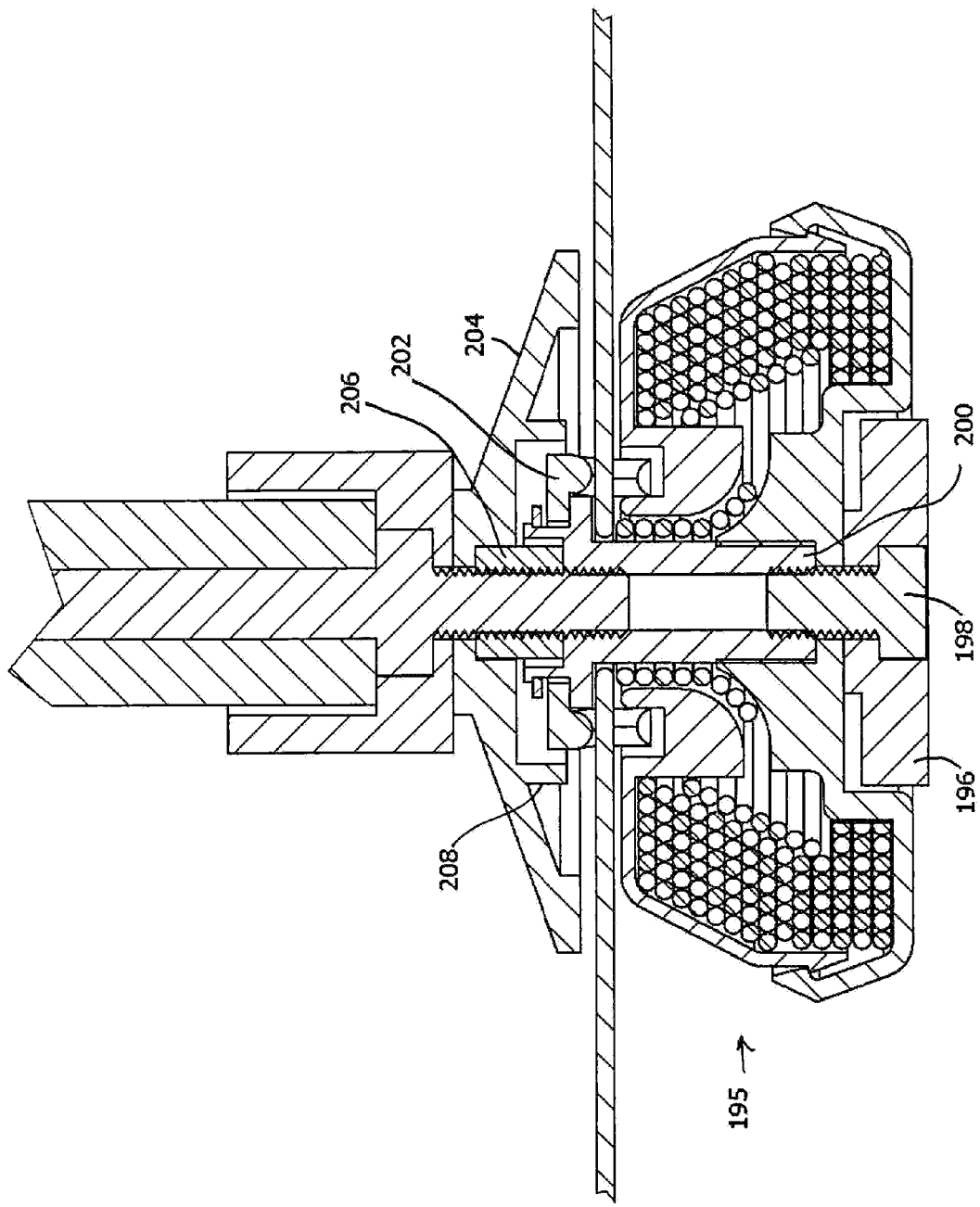
FIG. 12 is a vertical sectional view taken through the device of a seventh embodiment rotary flail feeding device.

FIG. 12 illustrates another top feed rotary flail feeding device similar to the device illustrated in FIG. 11 with a head 195 identical to head 180, handle 196 identical to handle 182 and handle mounting bolt 198 identical to bolt 192. Post 200 and ring 202 are identical to member 184 and ring 188. A rotatable shield 204, like shield 126 in FIG. 8, is confined between the lower end of the boom and nut 206. Wall 208 surrounds ring 202. The FIG. 12 rotary flail feeding device operates and is loaded identically to the device shown in FIG. 11 but has the advantage of rotating shield 204.

Figure 13:
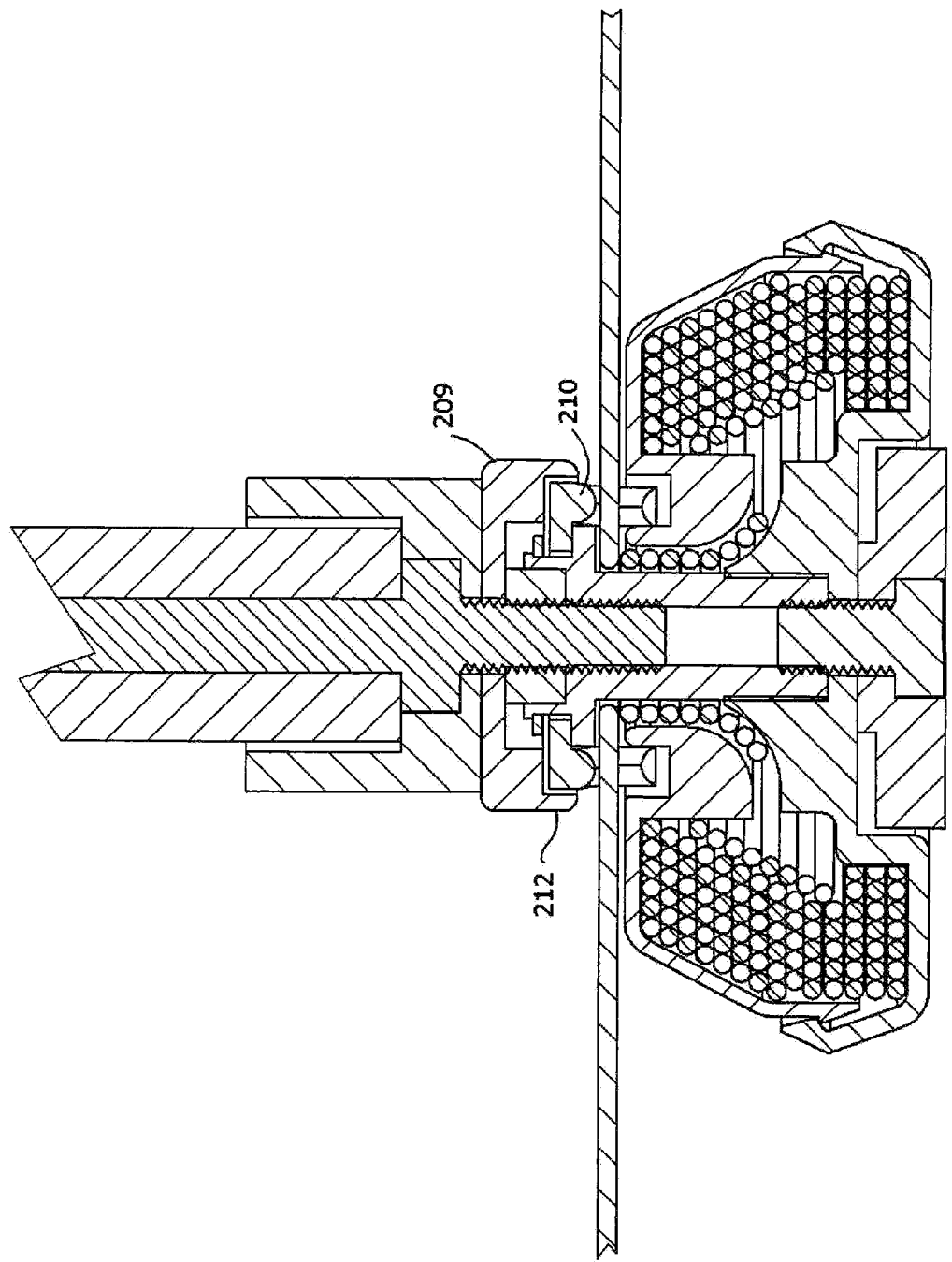
FIG. 13 is a vertical sectional view taken through the device of an eighth embodiment rotary flail feeding device.

FIG. 13 illustrates a further top feed rotary flail feeding device identical to the device shown in FIG. 12 but with a smaller rotating shield 209 extending over the line dividing or separating ring 210. Shield 209 is identical to shield 138 illustrated in FIG. 9 and previously described. Wall 212 surrounds ring 210.

All shields for top feed heads include a wall surrounding the line feed ring. The walls help prevent debris and cuttings from collecting between the ring and the post and preventing free rotation of the ring around the member during flail feeding.

While I have illustrated and described preferred embodiments of my invention, it is understood that this is capable of modification, and I therefore do not wish to be limited to the precise details set forth, but desire to avail myself of such changes and alterations as fall within the purview of the following claims.

I claim:

1. A rotary flail feeding device comprising a head and a unitary subassembly, said head having walls defining a cavity for holding coiled flail line, a central recess extending into the head from an open recess end, and a line feed passage extending from said cavity to said recess; said subassembly comprising a line winding post and a line guide rotatably mounted on and surrounding the post, the line guide having opposed first and second slots, the post having an end, a line winding surface surrounding the post and located between the end and the line guide, and first and second line guide retention members; said subassembly having an operative position wherein the post extends into the recess, the line guide is positioned adjacent the open end of the recess and the line winding surface extends from the line feed passage to the line guide for automatic feeding of flail line from the cavity, through the passage, around the winding surface, through the slots in the line guide and outwardly from the subassembly, and a loading position wherein the subassembly is withdrawn from the recess as a single unit with the line guide retention members holding the line guide on the post to permit feeding of flail lines into the recess, through the feed passage and into the cavity and the line guide is retained on the post by said retention members.

2. The device as in claim 1 wherein said line guide surrounds said line winding post and includes a second slot opposed to said first slot.

3. The device of claim 1 wherein said line guide retention members comprise two surfaces facing in opposite directions along the post for engaging the line guide to prevent movement of the line guide from the post.

4. The device of claim 1 wherein one retention member comprises a clip.

5. The device of claim 1 wherein one retention member comprises a collar.

6. The device of claim 1 wherein one retention member comprises a removable member on the post, said removable member permitting mounting of the line guide on the post.

7. The device as in claim 1 including a circumferential shield overlying the line guide, the shield including a wall surrounding the line guide.

8. The device as in claim 7 wherein the shield extends outwardly beyond the wall and overlies the body; and including a circumferential flail feed slot surrounding the line guide between the shield and the body.

9. The device as in claim 8 wherein the shield rotates with the head and subassembly.

10. The device as in claim 8 wherein the shield does not rotate with the body and subassembly.

11. The device as in claim 1 including a circular groove in the body surrounding the recess, said line guide extending into the groove.

12. The device as in claim 1 wherein the recess opens into the bottom of the body and the top of the body is attached to a trimmer boom.

13. The device as in claim 12 wherein said subassembly includes a handle for removably mounting the subassembly and head on a rotating member.

14. The device as in claim 1 wherein the recess extends into the top of the body and the subassembly is attached to a trimmer boom.

15. The device as in claim 1 including two lengths of flail line coiled in the cavity, and wherein the second slot is 180° opposed to said first slot wherein the second slot is 180° opposed to said first slot.

16. The device as in claim 1 including two lengths of flail line coiled in said cavity.

* * * * *

UNITED STATES PATENT AND TRADEMARK OFFICE
CERTIFICATE OF CORRECTION

| | | |
|---|---|---|
| PATENT NO. | : 7,395,601 B2 | Page 1 of 1 |
| APPLICATION NO. | : 11/677609 | |
| DATED | : July 8, 2008 | |
| INVENTOR(S) | : Robert C. Berfield | |

It is certified that error appears in the above-identified patent and that said Letters Patent is hereby corrected as shown below:

Column 8, line 30, delete claim 2, lines 30 to 33.

Column 9, line 4, delete "wherein the second slot is 180° opposed to said first slot".

Signed and Sealed this

Seventh Day of October, 2008

JON W. DUDAS
*Director of the United States Patent and Trademark Office*